United States Patent
Pita et al.

(10) Patent No.: US 8,359,185 B2
(45) Date of Patent: Jan. 22, 2013

(54) RESERVOIR SIMULATION OF GIANT SUBSURFACE RESERVOIRS WITH ACCELERATED PHASE EQUILIBRIUM DETERMINATION

(75) Inventors: Jorge A. Pita, Dhahran (SA); Nabil M. Al-Zamel, Dhahran (SA); Ali H. Dogru, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 239 days.

(21) Appl. No.: 12/827,477

(22) Filed: Jun. 30, 2010

(65) Prior Publication Data

US 2012/0004892 A1 Jan. 5, 2012

(51) Int. Cl.
G06G 7/50 (2006.01)
G06G 7/48 (2006.01)
(52) U.S. Cl. .............................. 703/9; 703/10
(58) Field of Classification Search .......... 703/10, 703/9
See application file for complete search history.

(56) References Cited

U.S. PATENT DOCUMENTS

| | | | |
|---|---|---|---|
| 7,373,285 B2 | 5/2008 | Webb | |
| 7,526,418 B2 | 4/2009 | Pita | |
| 7,548,840 B2 | 6/2009 | Saaf | |
| 7,596,480 B2 | 9/2009 | Fung | |
| 7,660,711 B2 | 2/2010 | Pita | |
| 2007/0279429 A1* | 12/2007 | Ganzer | 345/582 |
| 2009/0276100 A1 | 11/2009 | Malki | |
| 2010/0157732 A1* | 6/2010 | Saenger et al. | 367/38 |
| 2011/0120702 A1* | 5/2011 | Craig | 166/250.1 |

FOREIGN PATENT DOCUMENTS

| | | |
|---|---|---|
| EP | 1869579 A2 | 12/2007 |
| WO | 2006/020952 A2 | 2/2006 |

OTHER PUBLICATIONS

Baker et al., MIMD Implementations of Linear Solvers for Oil Reservoir Simulation, Parallel Computing, Elsevier Publishers, Amsterdam, NL, vol. 16, No. 2-3, Dec. 1, 1990, pp. 313-334, XP026758627.

Wallis et al., Constrained Residual Acceleration of Conjugate Residual Methods, SPE Papers, No. 13536, Jan. 1, 1985, pp. 415-428, XP000910569.

Dogru et al., A Next-Generation Parallel Reservoir Simulator for Giant Reservoirs, Society of Petroleum Engineers Journal, 119272, Feb. 2009, pp. 1-29, XP002679660.

Bydal, GPU-Accelerated Simulation of Flow Through a Porous Medium, May 25, 2009, pp. 11-15, University of Agder, Agder, XP002679661.

(Continued)

*Primary Examiner* — David Silver
(74) *Attorney, Agent, or Firm* — Bracewell & Giuliani, LLP

(57) ABSTRACT

A computer system analyzes data from giant subsurface hydrocarbon reservoirs which are organized into a number of component cells and simulates the conditions in the reservoirs based on determination of thermodynamic phase equilibrium using equation of state (EOS) modeling. The computer system takes the form of a heterogeneous (hybrid) computer environment which includes computer processor units (or CPU's) and graphical processing units (or GPU's). The system takes advantage of computational acceleration capabilities of the graphical processing units while utilizing the computer processing units for execution control, input/output of data and memory. Processing time requirements are reduced by more than an order of magnitude speed improvement over existing methods.

20 Claims, 5 Drawing Sheets

OTHER PUBLICATIONS

Naimi-Tajdar et al., A Fully Implicit, Compositional, Parallel Simulator for IOR Processes in Fractured Reservoirs, Society of Petroleum Engineers Journal, vol. 12, No. 3, Sep. 2007, pp. 367-381, XP002679662.

Han et al., Coupling Equation-of-State Compositional and Surfactant Models in a Fully Implicit Parallel Reservoir Simulator Using the Equivalent-Alkane-Carbon-Number Concept, Society of Petroleum Engineers Journal, vol. 14, No. 2, Jun. 2009, pp. 302-310, XP002679663.

PCT/US2011/042085 International Search Report and Written Opinion dated Aug. 22, 2012.

* cited by examiner

RESERVOIR SIMULATION OF GIANT SUBSURFACE RESERVOIRS WITH ACCELERATED PHASE EQUILIBRIUM DETERMINATION

BACKGROUND OF THE INVENTION

1. Field of the Invention

The present invention relates to computerized simulation of hydrocarbon reservoirs in the earth, and in particular to simulation and forecasting of production from such reservoirs with determination of phase equilibrium conditions in cells of the reservoirs.

2. Description of the Related Art

The early development of compositional reservoir simulators in the industry was, so far as is known, restricted to reservoir models small enough to be characterized by a relatively small number of cells (of the order of 100,000) into which the reservoir of interest was organized. Models of this early type provided adequate numerical resolution for small to medium size reservoirs or fields.

The early models became too coarse in data content and accuracy for what have become known as giant oil and gas fields. Giant reservoirs are those mammoth subsurface reservoirs at various locations on the earth containing hydrocarbons and other fluids. In giant reservoirs, there may be thousands of wells, and possibly hundreds of well groups, with tens of thousands of completions, when the total number of wells is considered. For giant reservoirs, the sheer volume of the data involved becomes a problem in simulation and analysis of performance over a period of time.

The problem caused by the volume of data for a giant reservoir has been even more the case when results are simulated for reservoir performance at each of a number of dates over a period of time, such as the expected production life in years for the reservoir. As a result of this, sufficient cell resolution was possible in some instances. However this required a compromise at the expense of dividing the giant reservoir model into separate sectors. The data for the different, separate sectors were then each separately processed.

Compositional reservoir simulation also required fast and accurate computation of phase equilibrium compositions of the fluids in the reservoir. Typical reservoir simulation was predicated on the presence in the formation fluids of a number of hydrocarbon components, which could be on the order of from eight to seventeen, based upon laboratory fluid characterization, as well as water.

There has also been increased interest in reservoir analysis for taking into account enhanced oil recovery methods and $CO_2$ sequestration. In order that simulation results for this purpose be accurate, inorganic components (such as nitrogen, $CO_2$, sulfides, for example) had to be included along with the hydrocarbons and water as reservoir fluids which would be present in the reservoirs as a result of these processes. Inclusion of inorganic components into the reservoir simulation process thus added to the already large number of reservoir hydrocarbon components and water.

Simulation of fluid composition and behavior over time in a reservoir has been governed by an equation of state (or EOS) determination for each of the multiple component hydrocarbons and water which were present in the reservoir cells in various proportions. As mentioned, an EOS determination was made for each of the reservoir cells during reservoir simulation at a number of spaced time intervals over the projected reservoir productive life. Depending on pressure changes and the like over the projected reservoir life, the relative percentages of hydrocarbons present and the relative amounts of gaseous phase and liquid or vapor phase also had to be taken into account.

Another area of increasing recent interest has been in the area of online/interactive reservoir simulation to monitor producing oil and gas fields, also referred to as I-Field technology. U.S. Published Patent Application No, 2009/0276100, commonly owned with the present application, is an example of this type of real-time reservoir management. For online/interactive simulation of this type to be meaningful and effective, it was important that the reservoir simulator produced accurate results at a speed which would keep pace with the rate of real-time acquisition of field measurement data from the reservoir.

U.S. Pat. No. 7,526,418, which is assigned to the assignee of the present application, provided a simulator for dealing with certain aspects of giant reservoir models. In doing so, reservoirs were organized into cells which were organized into a model having millions of cells. Although significant reduction in processing time and more accurate data resolution were provides, recent needs in the art have increased data processing speed and accuracy requirements in reservoir simulation.

Examples of other simplifications and compromise measures which have been taken in other contexts to avoid extensive computation or processing computer time are shown in the prior art. U.S. Pat. No. 7,548,840 is an example of efforts save computer time by reducing the number of variables (components) to be computed using approximations.

When application to multi-million (or billion) cell compositional reservoir simulation was not intended, then slow conventional methods can be tolerated in many cases. For example, when only surface facilities, and not reservoirs, are involved (as in production allocation systems of commingled fluid streams), commercial (CPU-based) process simulators have generally been quite adequate. U.S. Pat. No. 7,373,285 is an example of such an application where processing speed was not a concern.

SUMMARY OF THE INVENTION

Briefly, the present invention provides a new and improved method of computerized simulation in a computer system of a plurality of data processors. The data processors include at least one central processing unit and at least one graphical processing unit, and an output display. The computerized simulation is of component compositional variables of oil and gas phases of component hydrocarbon fluids of a giant subsurface reservoir and is done to simulate performance and production from the reservoir. The giant subsurface reservoir being simulated is partitioned into a number of cells which are arranged in an organized system of cells. The simulation is based on geological and fluid characterization information for the cells of the reservoir. The method of the present invention involves computer processing steps of receiving geological and fluid characterization information for the cells and the reservoir in the central processing unit and transferring the geological and fluid characterization information to the graphical processing unit. The method of the present invention also includes processing the geological and fluid characterization information in the graphical processing unit to determine the phase of the component compositional variables of the fluid phases of component fluids of the cells of the reservoir. The determined phases of the component compositional variables are then transferred from the graphical processing unit to the central processing unit. An output display is formed of the component compositional variables of the individual hydrocarbon species of the oil and gas phases of the cells at desired locations in the giant subsurface reservoir to thus simulate performance and production from the giant reservoir.

The present invention also provides a new and improved data processing system for computerized simulation of state changes of fluids in underground layered formations of a reservoir in the earth, the data processing system includes: a central processor which receives geological and fluid characterization information for the cells and the reservoir in the central processing unit and transfers the geological and fluid characterization information to a graphical processing unit of the data processing system. The data processing system also includes a graphical processor which processes the geological and fluid characterization information to determine the phase of the component compositional variables of the phases of component fluids of the cells of the reservoir. The graphical processor also transfers the determined phases of the component compositional variables of the oil and gas phases of component hydrocarbon fluids of the cells of the reservoir to the central processing unit. A memory in the data processing system stores the determined phases of the component compositional variables of the oil and gas phases of component hydrocarbon fluids of the cells of the reservoir.

The present invention further provides a new and improved data storage device having stored in a computer readable medium computer operable instructions for a data processing system which comprises at least one central processing unit, at least one graphical processing unit, and an output display to simulate state changes of fluids in underground layered formations in the earth. The instructions stored in the data storage device causes the data processing system to receive geological and fluid characterization information for the cells and the reservoir in the central processing unit, and also transfer the geological and fluid characterization information to the graphical processing unit. The instructions cause processing of the geological and fluid characterization information in the graphical processing unit to determine the phase of the component compositional variables of the phases of component fluids of the cells of the reservoir. The instructions also cause the transfer of the determined phases of the component compositional variables from the graphical processing unit to the central processing unit. The instructions also cause forming of output displays of the component compositional variables of the individual hydrocarbon species of the oil and gas phases of the cells at desired locations in the giant subsurface reservoir.

DETAILED DESCRIPTION OF THE PREFERRED EMBODIMENT

Figure 1:
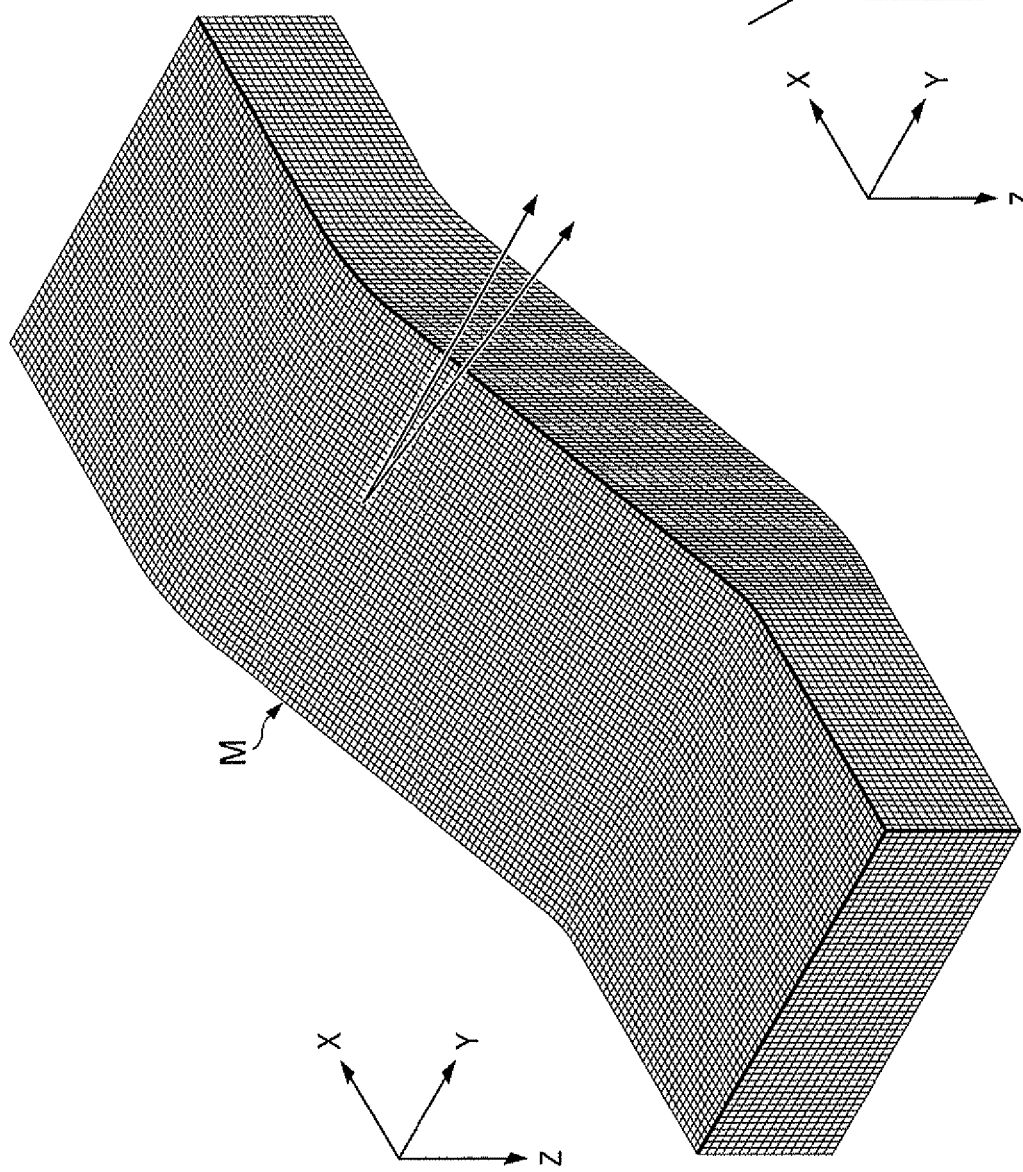
FIG. 1 is an isometric view of a compositional model of a giant subterranean hydrocarbon reservoir organized into a number of cells.

In the drawings, the letter M designates a simplified model of a portion of a subsurface hydrocarbon reservoir for which production results based on operating conditions and parameters are simulated over an estimated production life according to the present invention based on geological and fluid characterization information obtained for the cells of the reservoir. The results obtained are thus available and used for simulation of historical performance and for forecasting of production from the reservoir. Based on the results of such simulation, compositional models such as those described and shown in U.S. Pat. No. 7,526,418 are then formed and are available for evaluation and analysis. U.S. Pat. No. 7,526,418 is owned by the assignee of the present invention and is incorporated herein by reference An example reservoir of the type for which production data are simulated over the expected reservoir life as illustrated by the model M is usually one which is known to those in the art as a giant reservoir. A giant reservoir may be several miles in length, breadth and depth in its extent beneath the earth and might, for example, have a volume or size on the order of three hundred billion cubic feet.

Figure 2:
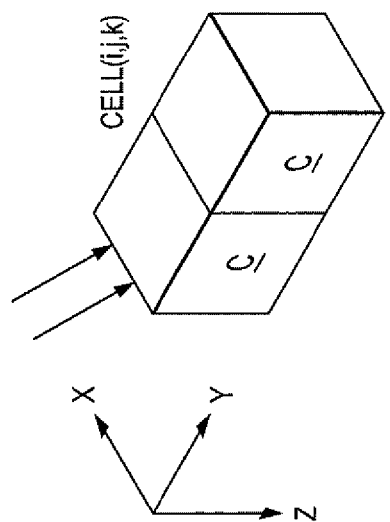
FIG. 2 is an enlarged isometric view of a group of adjacent cells from the compositional hydrocarbon reservoir model of FIG. 1.

The model M is partitioned into a number of cells C of suitable dimensions, several adjacent ones of which are depicted in FIG. 2 in enlarged form and scale from FIG. 1. In partitioning the volume of the reservoir into units of meaningful size for analytical purposes, typical cells are each eighty or so feet along their lateral dimensions in a common plane of reference in the reservoir fifteen or less feet in depth or thickness at that location in the reservoir. In some models, the thickness can be half a foot. The model M of FIG. 1 thus represents a reservoir composed of a million or more cells having these dimensions. It will be appreciated that the cells C shown in the drawings as forming the model M are considerably enlarged for illustrative purposes in comparison with the model M. Further information about models of this size and complexity is set forth in previously mentioned, incorporated by reference U.S. Pat. No. 7,526,418.

In the cells C of the model M, a fluid pressure is present, as well as moles $N_i$ of various components of a compositional fluid. At present, it is desirable for reservoir simulation purposes to analyze reservoir production data for as many as eight to seventeen (or more) possible component hydrocarbon fluids having moles $N_i$ through $N_n$, inclusive, as well as water having moles $N_w$ possible present as component fluids in the compositional fluid of the cells C.

Geometrically, for reference and location purposes, each individual cell C in the model M is located at a number co-ordinate location I, J, K in an x, y, z co-ordinate system, as shown in FIG. 1 at co-ordinates x=I; y=J; and z=K, and each of the $N_c$ possible fluid components n in cell C at location (I, J, K) has a possible mole fraction $x_i$ in the liquid phase and a possible mole fraction $y_i$ in the gas phase.

Compositional reservoir simulation requires fast and accurate computation of phase equilibrium compositions of the fluids in the reservoir. Recent interest in enhanced oil recovery methods and $CO_2$ sequestration requires that these and other inorganic components be added to the already large number of hydrocarbon components included in the model.

It can thus be appreciated that the number of cells and components of a compositional fluid in the model M are vastly beyond the normal processing capabilities of conventional compositional reservoir simulators, and that the reservoir would be considered giant. Thus, simulation of a reservoir of this size was, so far as is known, possible only by simplifications or assumptions which would compromise the accuracy of the simulation results, as has also been described above. U.S. Pat. Nos. 7,526,418, 7,660,711 and 7,596,480 which are owned by the assignee of the present application are examples of ways to reduce the effects of some of these simplifications and assumptions. Some of these Patents, such as U.S. Pat. No. 7,526,418 and U.S. Pat. No. 7,660,711 have used equation of state (EOS) processing techniques.

A complete set of phase equilibrium determinations should include not only the phase-split of the fluid in the reservoir (proportion of oil vs. gas) but also the individual compositions (molar fractions) of each hydrocarbon or non-hydrocarbon component in each of those two phases in the reservoir. Thermodynamic phase equilibrium computations using equation-of-state processing techniques are an essential component of compositional reservoir simulations. Since the equation of state is a highly complex and non-linear mathematical function, iterative procedures require a careful linearization of these equations, placing further demands on the computational burden.

One of the simplifying assumptions often made to accelerate these determinations has been to regard reservoir conditions as isothermal. Specifically, in determination of reservoir fluid conditions, the effect of reservoir temperature on phase conditions of the fluids was not taken into account. The governing set of equations for EOS determination is, however, in fact actually based on an equality of thermodynamic fugacities for both phases of a reservoir fluid. Accurate EOS determinations had to take into account the effect of non-isothermal conditions in the reservoir. This could be accomplished by including in the simulation process a determination of the fugacity of the fluid phases.

In thermodynamics, the natural logarithm of fugacity for phases of a fluid is an integral of P-V-T (pressure-volume-temperature) properties of the fluid. Therefore an equation-of-state (EOS) relating the P-V-T properties is required for accurate processing of reservoir data for accurate simulation and evaluation. Analytical integration of the fugacity integral, however, leads to complex logarithmic expressions which are computationally expensive to carry out.

Applicants have determined that tracking the "flash" or fugacity equilibrium of 10 or more components can account for 40% or more of total reservoir simulation time. In compositional reservoir simulators of the type used in the oil and gas industry, typical EOS computations (with 8 to 17 or more components) can take up to 40% or more of the total computation time, depending on the number of hydrocarbon components in the fluid and inorganic components present in the oil and/or added as part of enhanced recovery mechanisms (e.g. $CO_2$, $N_2$ and $H_2S$). Thus obtaining accurate simulation results indicative of reservoir conditions including temperature increased the simulation computation time by an order of magnitude or more. This was a substantial increase in already lengthy computer processing time, increasing and imposing time constraints on reservoir studies performable in any given time.

With the present invention, as is shown schematically in FIG. 2 a suitable group G of adjacent cells C in a particular region or subdivision of the model M are allocated by the data processing system P to a particular "node" of a CPU 12 (FIG. 3) and a group of GPU's 14 (FIG. 3) for processing. Thus, multiple computing "nodes" (typically composed of one or more CPU's and one GPU) can be used in parallel in order to sub-divide the reservoir into separate computational tasks, so that each CPU-GPU node or combination processes the data in its particular assigned subdivision of the reservoir.

In this fashion, reservoir models consisting of millions to billions of cells can be tackled in parallel by assigning several tens of thousands (or even more) of cells of one group G to a particular CPU-GPU combination dedicated to those cells for computational processing. Because thermodynamic flash computations for the cells depend only on the composition, pressure and temperature properties of an individual cell very scalable parallelism is easily achieved since no cell depends for computation processing on the results of processing from any other cell.

Figure 3:
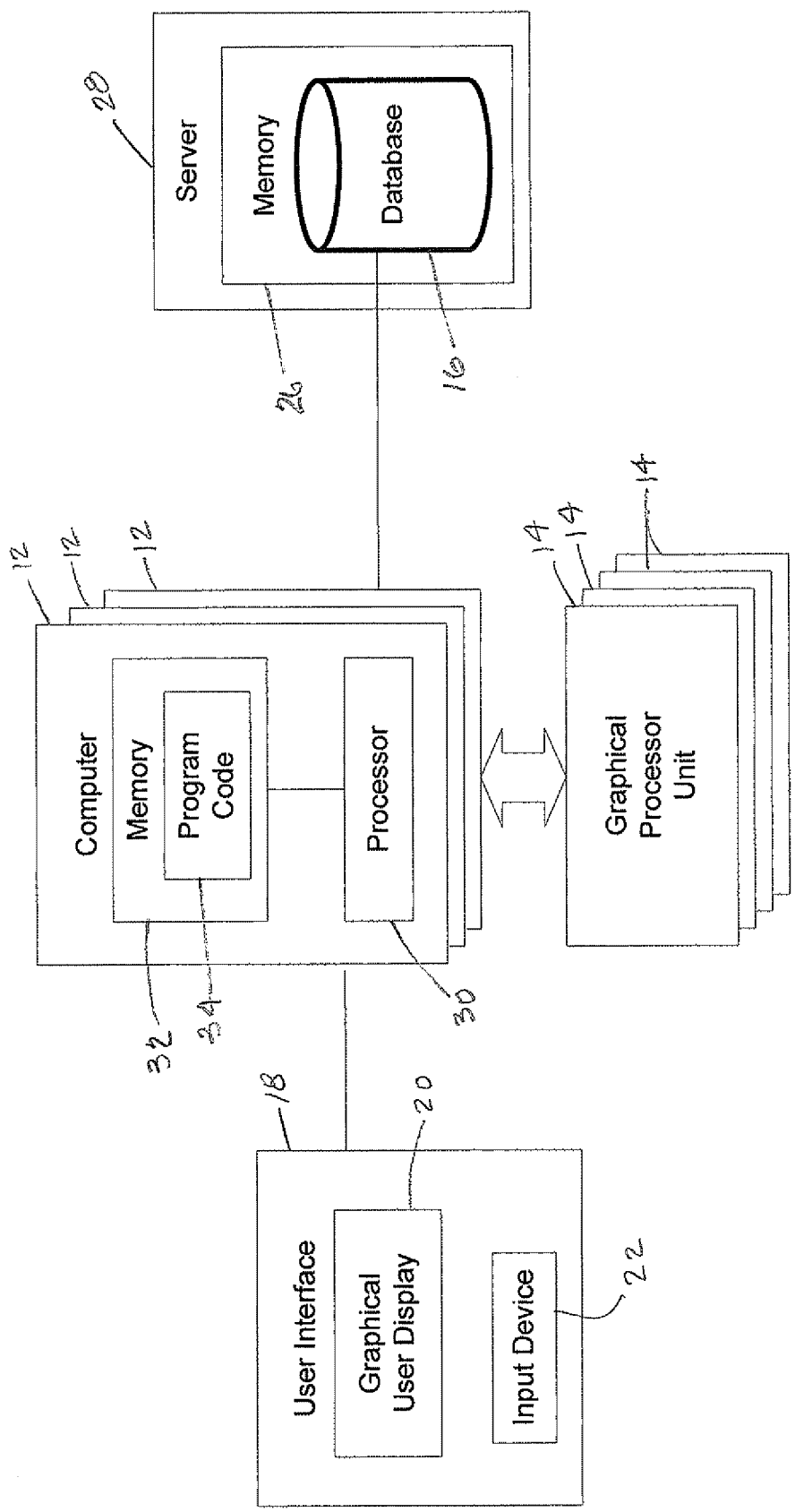
FIG. 3 is a schematic diagram of a computer system organized for reservoir simulation according to the present invention.

Considering now the data processing system according to the present invention, as illustrated in FIG. 3, a data processing system P is provided for computerized simulation of state changes of fluids in underground layered formations of the model of the reservoir in the earth. The data processing system P includes one or more central processing units or CPU's 12. The CPU or CPU's 12 has associated therewith a reservoir memory or database 16 for reservoir cell geological and fluid characterization information and a user interface 18. The user interface 18 includes a graphical display 20 for displaying graphical images, a printer or other suitable image forming mechanism and a user input device 22 to provide a user access to manipulate, access and provide output forms of processing results, database records and other information.

The reservoir memory or database 16 is typically in a memory 26 of an external data storage computer 28. The insertion database 16 contains data including the structure, location and organization of the cells in the model M, and data regarding wells, processing facilities, time-related well production data including measured static downhole pressure data, time-related injection well data including measured wellhead pressure and injection rate data, geological information and fluid characterization information and other reservoir production records and parameters for use in reservoir simulation, as will be described below.

The CPU computer 12 of data processing system P includes a processor 30 and an internal memory 32 coupled to the processor 30 to store operating instructions, control information and to serve as storage or transfer buffers as required. The data processing system P includes program code 34 stored in a memory 32 of the CPU or CPU's 14. The program code 34, according to the present invention, is in the form of computer operable instructions causing the CPU's 12 transfer data back and forth for processing by GPU's 14 to simulate state changes of fluids in underground formations, as will be set forth.

It should be noted that program code 34 may be in the form of microcode, programs, routines, or symbolic computer operable languages that provide a specific set of ordered operations that control the functioning of the data processing system P and direct its operation. The instructions of program code 34 may be stored in memory 32 or on computer diskette, magnetic tape, conventional hard disk drive, electronic read-only memory, optical storage device, or other appropriate data storage device having a computer usable medium stored thereon. Program code 34 may also be contained on a data storage device such as a computer readable medium.

The graphical units or GPU's 14 are general purpose, programmable graphical processing units, often also referred to as GPGPU's. The GPU's 14 are programmed to determine phase compositions of the fluids in the reservoir for the various component fluids, using EOS computations as will be set forth, for the hydrocarbon components in the fluid and inorganic components present in the oil and/or added as part of enhanced recovery mechanisms (e.g. $CO_2$, $N_2$ and $H_2S$).

Although the present invention is independent of the specific computer hardware used, one embodiment of the present invention is based on a quad-core CPU and a 240-core NVidia GPU. The CPU 12 is in the form of an AMD quad-core Barcelona 2.5 GHz processor and the GPU 14 is in this embodiment a 240-core NVidia Tesla S1070. It should be understood, however, that other computer hardware may also be used, as will be set forth below.

The present invention utilizes a dual-tier approach to acceleration via the GPU's 14 which deliver more than an order-of-magnitude speed improvement over earlier methods. The present invention accomplishes reservoir simulation in a heterogeneous (hybrid) computer environment including both CPU's 12 and GPU's 14. The present invention thus provides a computer-based system for conducting thermodynamic phase equilibrium computations using equation of state (EOS) modeling. The present invention is designed and implemented to utilize the computational acceleration capabilities of the GPU's (Graphical Processing Units) 14.

The acceleration of the EOD processing sequence of the reservoir simulation process by an order of magnitude or more obtained in the present invention can have a substantial impact in saving computer time, reducing costs and also allowing more reservoir studies to be carried out within given time constraints. Another important application of the present invention is in online/interactive reservoir simulation to monitor producing oil and gas fields (I-Field technology). As will be set forth, processing times have achieved a speed up by a factor of 17 in some instances. Acceleration of the computations by GPU in the present invention enables much faster determinations than previously possible, so that the reservoir simulator can keep pace with real-time data acquisition of field measurements.

Modeling Methodology and Mathematical Foundations

Figure 4:
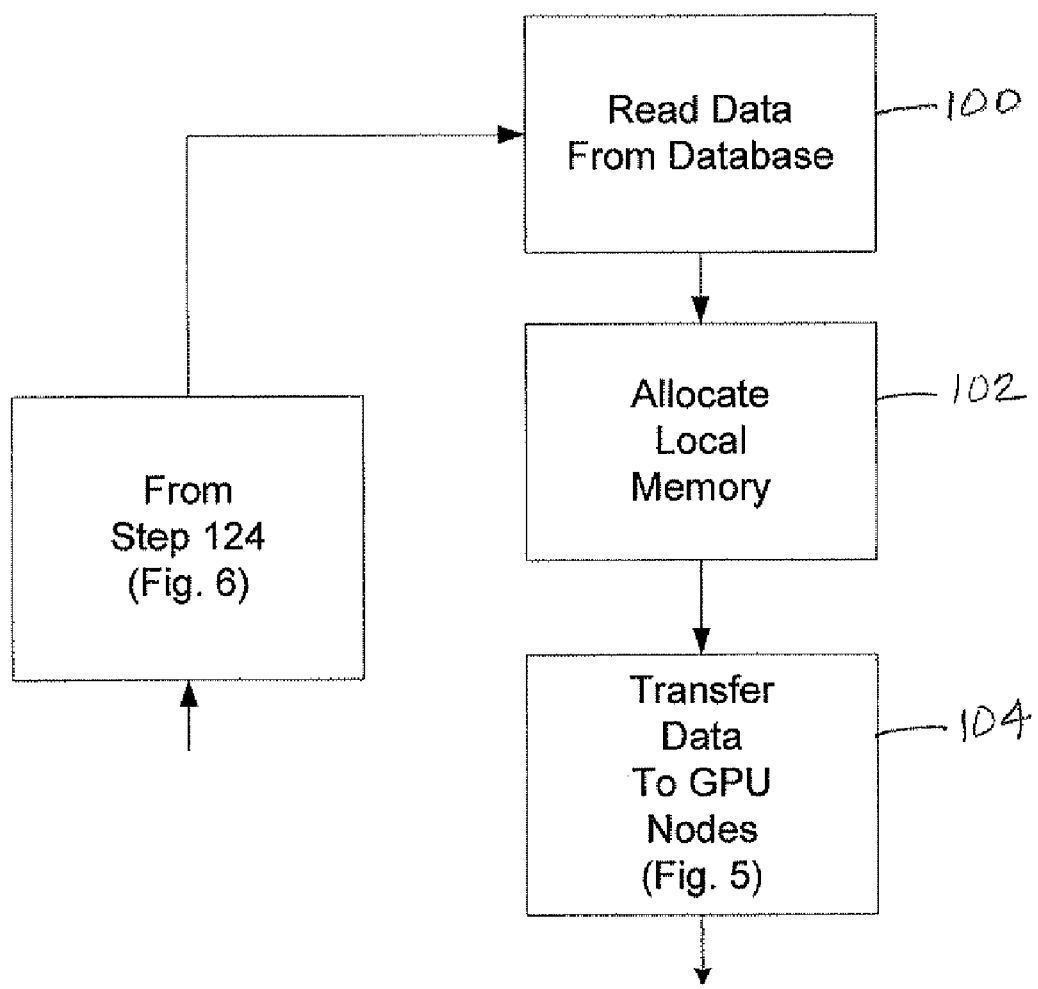
FIG. 4 is a functional block diagram of a portion of a set of data processing steps performed in a computer data processing unit or CPU of the computer system of FIG. 3 during computerized reservoir simulation of a subterranean reservoir according to the present invention.
Figure 5:
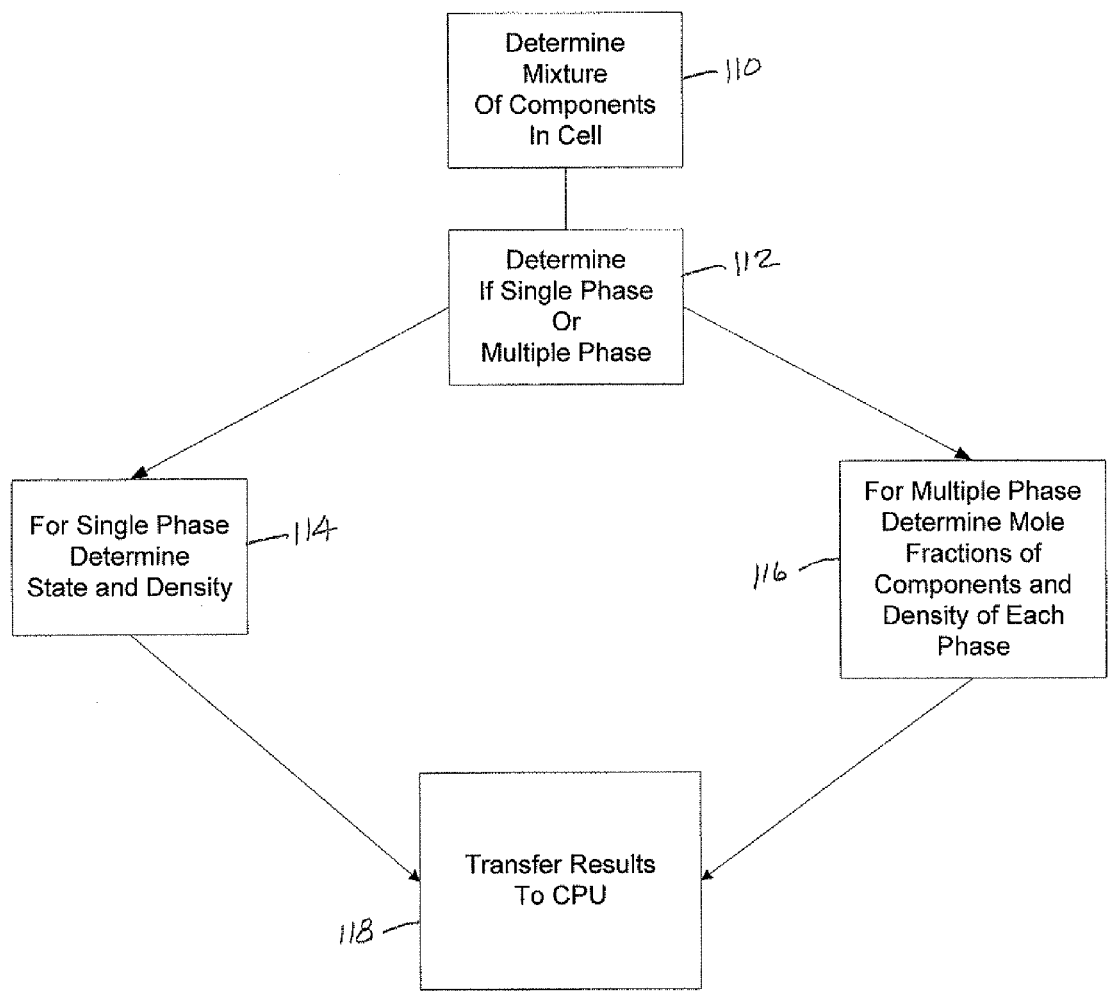
FIG. 5 is a functional block diagram of the portion of a set of data of processing steps performed in a graphical processing unit or GPU of the computer system of FIG. 3 during computerized reservoir simulation of a subterranean reservoir according to the present invention.
Figure 6:
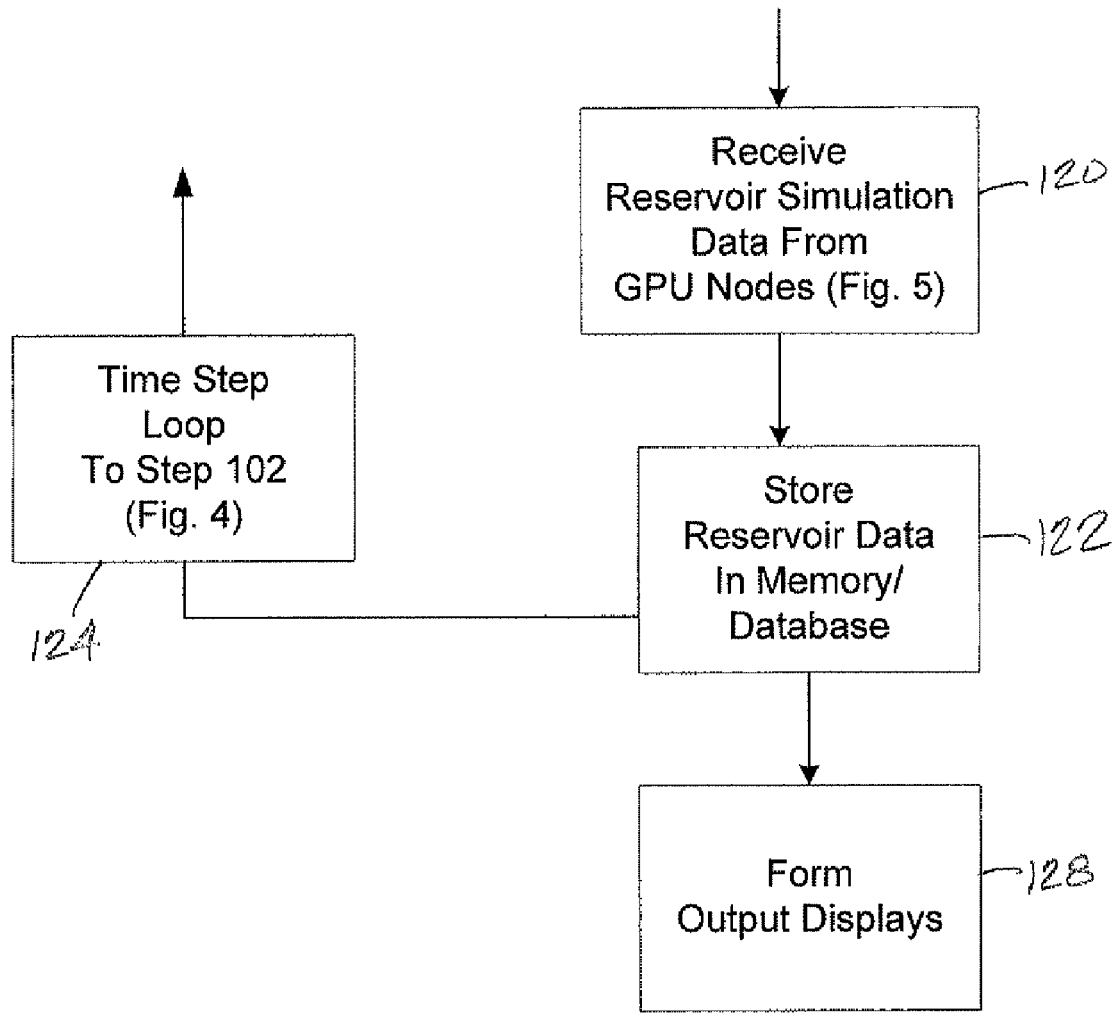
FIG. 6 is a functional block diagram of a portion of a set of data processing steps performed in a computer data processing unit or CPU of the computer system of FIG. 3 during computerized reservoir simulation of a subterranean reservoir according to the present invention.

Thermodynamic phase equilibrium computations according to the present invention takes the form of the following set of processing steps illustrated in FIGS. 4, 5 and 6 of the drawings. With the present invention, the CPU takes care of reading the data, providing logic control and allocating local memory. Further, with the present invention the heavy computational burden is transferred to the GPU. Transferring the information from CPU to GPU requires low level C-programming (e.g. NVidia's CUDA-C) or high-level FORTRAN-90 programming (e.g. CUDA-FORTRAN or acceleration directives, as in the commercial PGF90 compiler by The Portland Group).

In either case, a certain amount of overhead is incurred in a three-stage process for every cell in the reservoir model: (a) the data (pressure, temperature and cell compositions) is transferred from the CPU to the GPU as indicated in FIG. 4; (b) computations are performed in the GPU to determine phase stability, split ratio and density of the phases and individual phase compositions per component as illustrated in FIG. 5; and (c) the computation results generated during GPU processing are transferred back to the CPU and from there to the database, as shown in FIG. 6.

Given the large amount of computation involved, results have shown that the cost of bi-directional transfer of the data between CPU and GPU (stages a and c) is relatively small compared with the considerable performance gain (speedup) obtained from performing the compute-intensive algorithms on the GPU (stage b). This is particularly true for multi-million and billion-cell requirement in reservoir simulation.

During stage a, as illustrated in FIG. 4, data is read from reservoir database memory 16 for the model M at a particular time of interest as indicated at step 100. Internal memory 32 in the CPU 12 is then allocated as indicated at 102, and during stage 104 the reservoir data is transferred to the assigned GPU 14 according to the data allocation or sub-division described above.

Since the equation of state is a highly complex and non-linear mathematical function, iterative procedures require a careful linearization of these equations, placing further demands on the computational burden. Each cell in the compositional simulator can be thought of as comparable to a splitter or separator unit in an oil refinery, performing a flash separation between the components of oil at a given pressure and temperature in a manner like such a refinery unit. Equation of state analysis thus requires an iterative determination process to converge to the equality of fugacities between phases for each component. A compositional simulator is expected to perform such flash computations routinely and robustly, even billions of times depending on the number of cells in the model, as the pressure, temperature, and composition in each cell change.

During stage b (FIG. 5), the processing steps performed in the nodes of the GPU's are of three categories. The first or initial processing step 110 involves stability analysis determination in each reservoir cell. A system of multi-component equations representing minimization of the Gibbs Free Energy of the mixture is solved to determine as indicated at step 112 whether the mixture of components exists in one single phase or in multiple-phases under the existing conditions of pressure and temperature. This processing is described in more detail below in the section titled "Stability Analysis".

The second type of processing is that of phase identification for the single-phase reservoir cells. During this processing, if a single phase is determined in step 112 of the first processing, that phase is identified during step 114 as either a liquid or a gas phase. This processing is described in more detail in the "Phase Identification" section below.

The third type of processing in the GPU's 14 is indicated at step 116, involving flash computation for two-phase reservoir cells. During this processing, cells which are determined to have two-phases present during the first or initial processing are "flashed" into its liquid and gas split fractions to determine the individual compositions (mole fractions) of each component in each phase. The governing set of equations for this determination is the equality of thermodynamic fugacities in both phases. These equations are highly nonlinear and one such equation is formulated for each component in the mixture. In thermodynamics, the natural logarithm of fugacity is an integral of P-V-T (pressure-volume-temperature) properties of the fluid and, therefore, an equation-of-state (EOS) relating the P-V-T properties is required for its evaluation.

The present invention uses two popular EOS: Peng-Robinson and Soave-Redlich-Kwong. Analytical integration of the fugacity integral leads to complex logarithmic expressions which are computationally expensive to carry out (and very advantageous for processing in the GPU). The equation of state processing is described in more detail in the section "EOS and Property Determination" below. The flash computations processing is described in the section "Flash Computation for Two-Phase Cells" below. When processing of steps for the cells of the model are completed, the reservoir simulation results are transferred to the CPU 12 as indicated at step 118.

During stage c of the processing (FIG. 6), the reservoir simulation results from the GPU's 14 are received in the CPU 12 as indicated at step 120 to continue simulation, and then transferred to the reservoir database 16 as indicated by step 122. The time interval is incremented to the next time of interest as indicated at step 124 and processing control transferred again to step 100 for receipt of a further set of data. As indicated at step 128, an output display of data of interest may be formed at appropriate times with display 20.

The processing step illustrated in FIG. 5 are carried out at each cell, for each nonlinear iteration of the simulator, and at each time step. Considering that a typical model for giant reservoirs may have 500-million-cells and require an average of 4 nonlinear iterations per time step and an average of 2000 time-steps for a 50-year simulation, the number of phase equilibrium computations performed during GPU processing can easily reach the trillions. Therefore, acceleration of this essential kernel of the simulation has a dramatic impact on overall simulation turnaround time. As discussed earlier, the stability analysis processing involves multiple logarithmic evaluations. Similarly, flash computation processing of step 116 has multiple transcendental function evaluations. The processing of step 110 performed with the present invention lends itself to very effective utilization of the GPU.

The acceleration provided with the present invention by GPU's is exploited at two different levels in the algorithms of the invention. At the first level, the iterative nonlinear solution of the systems of Gibbs Free energy minimization and of fugacity equations for multi-components is solved in the GPU to obtain acceleration. The complex mathematical form of these equations benefits from accelerated numerical computations, since their evaluation may be carried out billions of times during a typical compositional reservoir simulation.

At a second level, a competing set of regression equations are fitted to prior computations of pressure and compositions and the selected choice is used in order to predict the results from flash computations for new pressures and compositions, thus saving the expense of nonlinear iterations. The regression equations employ transcendental functions and fractional exponentiations that are extremely fast when carried out on GPU's, thus achieving an additional level of acceleration to that provided by iterative solution of the nonlinear equations.

Multiple computing "nodes" (typically consisting of one or more CPU's and one GPU) can be used in parallel in order to sub-divide the reservoir into separate computational tasks, so that each CPU-GPU combination processes the data in its particular subdivision of the reservoir. In this fashion, reservoir models consisting of millions to billions of cells can be tackled in parallel by assigning several tens of thousands (or even millions) of cells to each CPU-GPU combination. Given that thermodynamic flash computations only depend on the composition, pressure and temperature properties at every cell, very sealable parallelism is naturally achieved since no cell depends on the results of any other.

Note that this symbiotic CPU-GPU process is different, but complementary, to the parallelism of the implementation. Each computer "node", consisting of one or more multi-core CPU and one many-core GPU, handles only the "chunk" of reservoir assigned to it by the domain decomposition of the parallelization (i.e. MPI implementation). A large number of these nodes operate in parallel, with the typical compute "cluster" consisting of 512 of those nodes, each node consisting of two 4-core CPU's and one 240-core GPU.

Currently, the designations of "multi-core" CPU's are evolving between 4 and 8 computational cores per CPU and designations of "many-core" GPU are evolving between 240 and 512 computational cores per GPU.

At the present time, a CPU core contains considerably more memory (about 100×) and higher clock frequency (about 2× to 3×) than a GPU core. The limited memory imposes the need to transfer selectively the required information between the CPU and the GPU (stages a and c described above). Also note that the slower clock of the GPU core, relative to the CPU, is more than compensated for by the much larger number of GPU cores vs. CPU cores (50× to 100×).

EOS and Property Determination

Multicomponent fluid behavior is assumed to follow a thermodynamic equation-of-state (EOS). The EOS chosen should be accurate for both liquid and vapor phases, since its main purpose is to provide densities and fugacity coefficients for both phases during phase equilibrium computations. The present invention provides a choice of using Peng-Robinson or Soave-Redlich-Kwong, two popular equations-of-state widely known in the industry. The general (or "canonical") form of these equations of state is:

$$P = \frac{RT}{V - b_1} - \frac{a_m}{(V + b_2)(V + b_3)}$$

For Peng-Robinson, the b parameters are defined as:

$$b_1 = b_m; b_2 = (1+\sqrt{2})b_m; b_3 = (1-\sqrt{2})b_m$$

For Soave-Redlich-Kwong, the b parameters are defined as:

$$b_1 = b_m; b_2 = b_m; b_3 = 0$$

Furthermore, the following so-called "mixing rules" are used to generate EOS parameters from multi-component mixtures:

$$a_m = \left(\sum x_i \sqrt{a_i}\right)^2 - 2\sum_{j > i} x_i \sqrt{a_i}\, x_j \sqrt{a_j}\, \delta_{ij}$$

$$b_m = \sum x_i b_i$$

$$A_i = 2\sqrt{a_i}\left(\sum x_i \sqrt{a_i} - \sum_{j \neq i} x_j \sqrt{a_j}\, \delta_{ij}\right)$$

where the $x_i$ are the individual mole fractions of each component "i" in each phase. The $\delta_{ij}$ are the "binary interaction coefficients" which can be supplied as input (the default value is zero).

The individual values of each component's "a" and "b" parameters are given by:

$$a_i = W_A \frac{(RT_{ci})^2}{P_{ci}}[1 + W_F(1 - \sqrt{T_{ri}})]^2$$

$$b_i = W_B \frac{RT_{ci}}{P_{ci}}$$

For Peng-Robinson:

$$W_B=0.0778, W_A=0.45724$$

$$W_F=0.37464+1.54226\omega_i-0.26992\omega_i^2$$

For Soave-Redlich-Kwong:

$$W_B=0.0866, W_A=0.4275$$

$$W_F=0.48+1.574\omega_i-0.176\omega_i^2$$

$T_{ci}$, $P_{ci}$ and $\omega_i$ are the critical temperature, critical pressure and accentric factor of each component, which must be supplied as input data. $T_{ri}$ is simply the reduced temperature ($T_{ri}=T/T_{ci}$).

The $W_A$ and $W_B$ parameters are usually constant in the literature, but the present invention allows them to be specified as input because, in some cases, a more accurate fluid characterization can be achieved by changing these parameters.

In order to compute the equilibrium compositions (in both liquid and vapor phase, should both phases exist), a system of nonlinear equations must be solved, which enforce the thermodynamic constraint that, for each component, the product of the fugacity coefficient times mole fraction must be identical in both phases. This is thermodynamically equivalent to the equality of fugacities for both phases. In mathematical notation:

$$F=\ln(\phi_i^G y_i)-\ln(\phi_i^L x_i)=0$$

Notice that there is one such equation for each hydrocarbon component, so this represents a system of $N_c$ nonlinear equations (where $N_c$ is the number of components). The natural logarithm is typically used because the fugacity coefficients are usually given in logarithmic form. In order to compute the fugacity coefficient needed in this equation, the EOS must be integrated in accordance to the thermodynamic relationship:

$$\ln\phi = \int_0^P \left(\frac{V}{RT} - \frac{1}{P}\right)dP$$

Resulting in the analytical expression:

$$\ln\phi_i = \frac{b_i}{b_m}(Z-1) - \ln(Z-b_m) + \frac{1}{\gamma b_m}\left(\frac{a_m b_i}{b_m} - A_i\right)\ln\frac{Z+\alpha b_m}{Z+\beta b_m}$$

For which, using Peng-Robinson:

$$\alpha=1+\sqrt{2}; \beta=1-\sqrt{2}; \gamma=2\sqrt{2}$$

Or, using Soave-Redlich-Kwong:

$$\alpha=1; \beta=0; \gamma=1$$

The molar density of each phase (or rather its reciprocal, the molar volume) is solved from the cubic EOS. Unfortunately, the volume produced by such two-parameter (a-and-b) equations of state like Peng-Robinson and Soave-Redlich-Kwong tends to overestimate the gas volume and underestimate the liquid volume in many situations. This must be corrected by a third parameter (c), which is known as a "shift parameter":

$$V=V_{EOS}-c$$

or $$V=V_{EOS}-\Sigma s_i b_i x_i$$

where $s_i$ is the individual shift parameter per component which can be supplied as input (the default value is zero).

When performing flash computations, partial derivatives of fugacity with respect to composition are required. These are described in the next section and, because their derivation uses the Calculus chain rule, they are complex expressions that can be expensive in terms of time to compute. Each component requires computation of these derivatives for each cell in the model, an ideal scenario for which the multi-threaded computations the GPU's are well suited.

Derivatives of the Equation of State

For flash computation processing, it is necessary to obtain certain derivatives. These are described below.

Derivative of component fugacity with respect to pressure:

$$\frac{\partial \ln\phi_i}{\partial P} = \frac{b_i}{b_m}\frac{\partial Z}{\partial P} + \frac{\frac{b_m}{P} - \frac{\partial Z}{\partial P}}{Z-b_m} + \frac{\beta-\alpha}{c_1}\frac{\left(\frac{a_m b_i}{b_m} - A_i\right)\left(\frac{\partial Z}{\partial P} - \frac{Z}{P}\right)}{(Z+\alpha b_m)(Z+\beta b_m)}$$

Derivative of component fugacity with respect to mole fraction:

$$\frac{\partial \ln\phi_i}{\partial x_j} = \frac{b_i}{b_m}\frac{\partial Z}{\partial x_j} - \frac{b_i b_j}{b_m^2}(Z-1) + \frac{b_j - \frac{\partial Z}{\partial x_j}}{Z-b_m} -$$

$$\frac{1}{c_1 b_m}\left[\frac{2a_m b_i b_j}{b_m^2} - \frac{b_j A_i}{b_m} - \frac{b_i A_j}{b_m} + 2\sqrt{a_i}\sqrt{a_j}(1-\delta_{ij})\right]\ln\frac{Z+\alpha b_m}{Z+\beta b_m} +$$

$$\frac{\beta-\alpha}{c_1 b_m}\frac{\left(\frac{a_m b_i}{b_m} - A_i\right)\left(b_m\frac{\partial Z}{\partial x_j} - b_j Z\right)}{(Z+\alpha b_m)(Z+\beta b_m)}$$

In deriving the above expression the following two results have been used:

$$\frac{\partial A_i}{\partial P} = \frac{A_i}{P}$$

$$\frac{\partial A_i}{\partial x_j} = 2\sqrt{a_i}\sqrt{a_j}(1-\delta_{ij})$$

Derivative of compressibility factor with respect to pressure:

$$\frac{\partial Z}{\partial P} = -\frac{Z^2\frac{\partial B_1}{\partial P} + Z\frac{\partial B_2}{\partial P} + \frac{\partial B_3}{\partial P}}{3Z^2 + 2B_1 Z + B_2}$$

where, for Peng-Robinson:

$$B_1 = b_m - 1$$

$$B_2 = a_m - 2b_m - 3b_m^2$$

$$B_3 = -a_m b_m + b_m^2 + b_m^3$$

$$\frac{\partial B_1}{\partial P} = \frac{b_m}{P}$$

-continued $$\frac{\partial B_2}{\partial P} = \frac{a_m - b_m(2 + 6b_m)}{P}$$

$$\frac{\partial B_3}{\partial P} = \frac{-2a_m b_m^2(2 + 3b_m)}{P}$$

and, for Soave-Redlich-Kwong:

$$B_1 = -1$$

$$B_2 = a_m - b_m - b_m^2$$

$$B_3 = -a_m b_m$$

$$\frac{\partial B_1}{\partial P} = 0$$

$$\frac{\partial B_2}{\partial P} = \frac{a_m - b_m(1 + 2b_m)}{P}$$

$$\frac{\partial B_3}{\partial P} = \frac{-2a_m b_m}{P}$$

Derivative of compressibility factor with respect to mole fraction:

$$\frac{\partial Z}{\partial x_i} = -\frac{Z^2 \frac{\partial B_1}{\partial x_i} + Z \frac{\partial B_2}{\partial x_i} + \frac{\partial B_3}{\partial x_i}}{3Z^2 + 2B_1 Z + B_2}$$

where, for Peng-Robinson:

$$B_1 = b_m - 1$$

$$B_2 = a_m - 2b_m - 3b_m^2$$

$$B_3 = -a_m b_m + b_m^2 + b_m^3$$

$$\frac{\partial B_1}{\partial x_i} = b_i$$

$$\frac{\partial B_2}{\partial x_i} = A_i - 2b_i(1 + 3b_m)$$

$$\frac{\partial B_3}{\partial x_i} = -a_m b_i - A_i b_m + b_m b_i (2 + 3b_m)$$

and, for Soave-Redlich-Kwong:

$$B_1 = -1$$

$$B_2 = a_m - b_m - b_m^2$$

$$B_3 = -a_m b_m$$

$$\frac{\partial B_1}{\partial x_i} = 0$$

$$\frac{\partial B_2}{\partial x_i} = A_i - b_i(1 + 2b_m)$$

$$\frac{\partial B_3}{\partial x_i} = -a_m b_i - A_i b_m$$

Stability Analysis

A key problem associated with compositional flash computations is that the number of phases in equilibrium is not known in advance. A conventional approach has been to assume the number of phases present at equilibrium and to estimate initial values for the equilibrium factors (K-values). This procedure is repeated until convergence is obtained. Alternatively, the equilibrium can be formulated as a Gibbs free energy minimization problem.

Both approaches can fail if the initial estimate of the iteration variables is too inaccurate and both may require a substantial amount of computation, which would be impractical for compositional reservoir simulation where typically a flash must be performed at every reservoir model cell.

The present invention instead uses numerical methods for deciding whether a phase is thermodynamically stable. These, so-called "stability tests" require no user-provided initial estimates of number of phases present at equilibrium or of the equilibrium factors. Stability tests are based on what is known in the art as the "tangent plane criterion of Gibbs".

The Tangent Plane Criterion

An M-component mixture with component mole fractions $(z_1, \ldots, z_M)$ at temperature and pressure $(T_o, P_o)$ has a Gibbs energy of $$G_o = \sum_i n_i u_i^0$$

where $u_i^0$ is the chemical potential of component i in the mixture.

Assuming now that this mixture is being divided into 2 phases with mole numbers N-$\epsilon$ and $\epsilon$, the amount $\epsilon$ of the second phase being infinitesimal. Let the mole fractions in phase II be $(y_1, \ldots, y_M)$. The change in Gibbs energy is then $$\Delta G = G_I + G_{II} - G_o = G(N - \epsilon) + G(\epsilon) - G_o$$

A Taylor series expansion of $G_I$ disregarding second order terms in $\epsilon$ yields:

$$G(N - \varepsilon) = G(N) - \varepsilon \sum_i y_i \left(\frac{\partial G}{\partial n_i}\right)_N = G_0 - \varepsilon \sum_i y_i u_i^0$$

or, equivalently, $$\Delta G = G(\varepsilon) - \varepsilon \sum_i y_i u_i^0 = \varepsilon \sum_i y_i \lfloor u_i(\bar{y}) - u_i^0 \rfloor$$

Stability of the original mixture requires that its Gibbs energy is at the global minimum. Hence, a necessary condition for stability is that $$F(\bar{y}) = \sum_i y_i \lfloor u_i(\bar{y}) - u_i^0 \rfloor \geq 0$$

for all trial compositions $\bar{y}$.

Geometrically, F $(\bar{y})$ is the vertical distance from the tangent hyperplane to the Molar Gibbs energy surface at composition $\bar{z}$ to the energy surface at composition $\bar{y}$. Stability requires that the tangent hyperplane at no point lies above the energy surface.

For multiphase systems, a necessary condition for equilibrium is that the individual species have identical chemical potential in all phases. Because of this equality of potentials, the value of F does not depend on the phase investigated and, hence, the equation for F is also a sufficient condition for stability.

For equations of state computations it is more convenient to work in terms of fugacity coefficients, which gives as a stability criterion:

$$g(\bar{y}) = \frac{F(\bar{y})}{RT_o} = \sum_i y_i(\ln y_i + \ln \phi_i - h_i) \geq 0$$

where $\phi_i = \phi_i(\bar{y})$ and $h_i = \ln z_i + \ln \phi_i(\bar{z})$.

Straightforward differentiation with respect to the M−1 independent mole fractions yields the stationarity conditions:

$$\ln y_i + \ln \phi_i - h_i = k (i=1, 2, \ldots, M)$$

Introducing the new variables $Y_i = \exp(-k) y_i$ results in:

$$\ln Y_i + \ln \phi_i - h_i = 0 (i=1, 2, \ldots, M)$$

With the present invention, a computationally more efficient form is obtained by substituting as iteration variables $\alpha_i = 2\sqrt{Y_i}$ and then linearizing and applying the Newton-Raphson method. In terms of these, the relationships can be expressed:

$$q_i = \frac{\partial g^*}{\partial \alpha_i} = \sqrt{Y_i}(\ln Y_i + \ln \phi_i - h_i)$$

$$A_{ij} = \frac{\partial^2 g^*}{\partial \alpha_i \partial \alpha_j} = B_{ij} + \frac{1}{2}\delta_{ij}(\ln Y_i + \ln \phi_i - h_i)$$

with $$B_{ij} = \delta_{ij} + \sqrt{Y_i Y_j}\frac{\partial \ln \phi_i}{\partial Y_j}$$

Phase Identification

Also known as the "phase labeling step", the processing procedure to identify the nature of the single-phase encountered (liquid or gas) uses the previously computed quantities from the equation of state. The phase identification processing criteria are straightforward.

The thermodynamic phase is a liquid if these two conditions hold simultaneously:

$$\frac{a_m}{b_m} > \frac{W_A}{W_B} \text{ and } Z < Z_c \frac{b_m}{W_B}$$

Otherwise, the thermodynamic phase is a gas.

In the equations above, $Z_c$ is the "critical compressibility" for the equation of state (a constant value of 0.307).

Flash Computation for Two-Phase Cells

When the stability analysis processing indicates that two phases are present in a cell, the nonlinear equations establishing the equality of thermodynamic fugacities must be solved using an iterative technique. The Newton-Raphson method is the preferred one to solve this nonlinear system of fugacity equations.

From the thermodynamic equality of fugacities, $$F \equiv \ln(\phi_i^V y_i) - \ln(\phi_i^L x_i) = 0$$

The set of equations to be solved is:

$$f_i(K) = \ln(y_i) + \ln(\phi_i^V) - (\ln(x_i) + \ln(\phi_i^L)) = 0$$

Or, in terms of K-values ($K_i = y_i/x_i$):

$$f_i(K) = \ln(k_i) + \ln(\phi_i^V) - \ln(\phi_i^L) = 0$$

The Jacobian matrix for this system of equations is given by $$J_{ij} = \frac{\partial f_i}{\partial \ln K_j}$$

and the correction vector $\beta$ with $\beta_i = \Delta \ln K_i$ is found from $$J\beta = -f$$

The Jacobian matrix can be represented as the matrix equation:

$$J = BA^{-1}$$

with $$B_{ij} = \frac{z_i}{x_i y_i}\delta_{ij} - 1 + \frac{V_m L_m}{V_m + L_m}\left(\frac{\partial \ln \phi_i^V}{\partial n_j} + \frac{\partial \ln \phi_i^L}{\partial n_j}\right)$$

$$A_{ij} = \frac{z_i}{x_i y_i}\delta_{ij} - 1$$

The K values obtained during the iteration are used to compute q, the phase-split of the mixture (i.e. the ratio of moles in the gas phase divided by the total number of moles) from the Rachford-Rice equation:

$$F(q) = \sum_i^M z_i \cdot \frac{K_i - 1}{1 + q(K_i - 1)} = 0$$

The value of q resulting from this equation is a decimal fraction between 0 and 1 (values close to 0 indicate that the mixture is substantially all liquid while values close to 1 indicate that the mixture is substantially all gas).

Once the value of "q" is determined, the individual phase compositions for both liquid (x) and gas phases (y) are determined, using the feed composition (z) and K-values, from:

$$x_i = \frac{z_i}{1 + q(K_i - 1)}$$

$$y_i = K_i x_i$$

Competing Regression Curves for K-Values and Vapor-Phase Fraction

As mentioned above, a competing set of regression equations are fitted to prior computations of pressure and compositions and the selected choice is used in order to predict the results from flash computations for new pressures and compositions. The set of regression equations are set forth below:

Linear fit:

$$Y = a + bX$$

Logarithmic fit:

$$\ln Y = a + bX$$

Power fit:

$$Y = aX^b$$

Exponential fit:

$$Y = a \cdot e^{bX}$$

Rational fit:

$$Y = \frac{1}{a + bX}$$

Reciprocal fit:

$$Y = a + \frac{b}{X}$$

Double-reciprocal fit:

$$\frac{1}{Y} = a + \frac{b}{X}$$

Quadratic-logarithmic fit:

$$Y = a + b \cdot \ln(X) + c \cdot [\ln(X)]^2$$

Cubic-logarithmic fit:

$$Y = a + b \cdot \ln(X) + c \cdot [\ln(X)]^2 + d \cdot [\ln(X)]^3$$

Rational-logarithmic fit:

$$Y = \frac{1}{a + b \cdot \ln(X)}$$

Rational scaled-exponential fit:

$$Y = \frac{1}{a + b \cdot e^{-X/X_o}}$$

Scaled-quadratic fit:

$$Y = a + b \cdot \frac{X}{X_0} + c \cdot \left(\frac{X}{X_0}\right)^2$$

Scaled-cubic fit:

$$Y = a + b \cdot \frac{X}{X_0} + c \cdot \left(\frac{X}{X_0}\right)^2 + d \cdot \left(\frac{X}{X_0}\right)^3$$

Exponential-reciprocal fit:

$$Y = a \cdot e^{\frac{b}{X}}$$

Reciprocal quadratic-logarithmic fit:

$$\frac{1}{Y} = a + b \cdot \ln(X) + c \cdot [\ln(X)]^2$$

Double-logarithmic quadratic fit:

$$\ln(Y) = a + b \cdot \ln(X) + c \cdot [\ln(X)]^2$$

Reciprocal-quadratic reciprocal-logarithmic fit:

$$\frac{1}{Y} = a + \frac{b}{\ln(X)} + \frac{c}{[\ln(X)]^2}$$

Reciprocal scaled-quadratic fit:

$$\frac{1}{Y} = a + b \cdot \frac{X}{X_0} + c \cdot \left(\frac{X}{X_0}\right)^2$$

Double-logarithmic reciprocal-quadratic fit:

$$\ln(Y) = a + \frac{b}{\ln(X)} + \frac{c}{[\ln(X)]^2}$$

Logarithmic scaled-quadratic fit:

$$\ln(Y) = a + b \cdot \frac{X}{X_0} + c \cdot \left(\frac{X}{X_0}\right)^2$$

Logarithmic inverse scaled-quadratic fit:

$$\ln(Y) = a + b \cdot \left(\frac{X_0}{X}\right) + c \cdot \left(\frac{X_0}{X}\right)^2$$

Polynomial-logarithmic fit:

$$Y = a + b \cdot [\ln(X)]^l + c \cdot [\ln(X)]^m + d \cdot [\ln(X)]^n$$

Polynomial scaled fit:

$$Y = a + b \cdot \left(\frac{X}{X_0}\right)^l + c \cdot \left(\frac{X}{X_0}\right)^m + d \cdot \left(\frac{X}{X_0}\right)^n$$

Reciprocal polynomial-logarithmic fit:

$$\frac{1}{Y} = a + b \cdot [\ln(X)]^l + c \cdot [\ln(X)]^m + d \cdot [\ln(X)]^n$$

Logarithmic polynomial-logarithmic fit:

$$\ln(Y) = a + b \cdot [\ln(X)]^l + c \cdot [\ln(X)]^m + d \cdot [\ln(X)]^n$$

Selection of the best equation among those given above requires performing a least-squares fit (regression step) on each to determine its statistical correlation coefficient. The curve with the highest correlation coefficient wins the competition and is used in the prediction step. These two steps are described in the following:

Regression Step

It is necessary to minimize the error between the actual value of a quantity "Y" and its estimated value "$Y_e$" for N observations, for which the problem can be viewed as a minimization of the squares of their differences (hence the name "least squares" often given to the method):

Minimize:

$$S = \sum_i^N (Y_i - Y_{ei})^2$$

In order to minimize S, the first partial derivatives of S with respect to each of the fitting parameters must be computed. Since all of these first derivatives must be zero to reach a minimum, they are solved simultaneously as a simple linear system of equations.

The solution is illustrated with the following example candidate regression (l, m and n are pre-defined numbers, typically 1, 2 and 3 but other integer or fractional values can be used):

$$Y_e = a + b \cdot X_i^l + c \cdot X_i^m + d \cdot X_i^n$$

S is formulated and derivatives taken with respect to the fitting parameters a, b, c and d, and equating them to zero:

$$S = \sum_i^N (a + b \cdot X_i^l + c \cdot X_i^m + d \cdot X_i^n - Y_e)^2$$

$$\frac{\partial S}{\partial a} = 2 \sum_i^N (a + b \cdot X_i^l + c \cdot X_i^m + d \cdot X_i^n - Y_e) = 0$$

$$\frac{\partial S}{\partial b} = 2 \sum_i^N (a + b \cdot X_i^l + c \cdot X_i^m + d \cdot X_i^n - Y_e) \cdot X_i^l = 0$$

$$\frac{\partial S}{\partial c} = 2 \sum_i^N (a + b \cdot X_i^l + c \cdot X_i^m + d \cdot X_i^n - Y_e) \cdot X_i^m = 0$$

$$\frac{\partial S}{\partial d} = 2 \sum_i^N (a + b \cdot X_i^l + c \cdot X_i^m + d \cdot X_i^n - Y_e) \cdot X_i^n = 0$$

These four linear equations in four unknowns (a, b, c and d) are solved simultaneously as a linear system to obtain the best-fit parameters:

$$\begin{bmatrix} N & \sum X_i^l & \sum X_i^m & \sum X_i^n \\ \sum X_i^l & \sum X_i^{2l} & \sum X_i^{l+m} & \sum X_i^{l+n} \\ \sum X_i^m & \sum X_i^{l+m} & \sum X_i^{2m} & \sum X_i^{m+n} \\ \sum X_i^n & \sum X_i^{l+n} & \sum X_i^{m+n} & \sum X_i^{2n} \end{bmatrix} \begin{bmatrix} a \\ b \\ c \\ d \end{bmatrix} = \begin{bmatrix} \sum Y_i \\ \sum X_i^l Y_i \\ \sum X_i^m Y_i \\ \sum X_i^n Y_i \end{bmatrix}$$

Prediction Step

The obtained values of the fitted parameters (a, b, c and d) are used in the regression equation to obtain the estimated value $y_e$. The correlation coefficient "r" is obtained by using the statistical formula:

$$r = \frac{N \sum_i^N Y_i Y_{ei} - \sum_i^N Y_i \sum_i^N Y_{ei}}{\sqrt{N \sum_i^N Y_i^2 - \left(\sum_i^N Y_i\right)^2} \cdot \sqrt{N \sum_i^N Y_{ei}^2 - \left(\sum_i^N Y_{ei}\right)^2}}$$

Values of "r" are in the range 0 to 1, with 1 being a perfect correlation and 0 meaning no correlation at all between the observed values and the estimated ones.

Application of Statistical Regression in the Present Invention

After several time steps have been computed (a typical value is 10, or N=10), the 25 candidate equations above are fitted to the data consisting of these N observations. A typical case is that X represents the pressure variable in the cell-block and Y represents either (a) the K-value for each component or (b) the "q" phase-split ratio. When only the K vs. Pressure values from the N previous steps of the simulation are fitted, the value of "q" is computed from the Rachford-Rice equation given earlier. No flash fugacity-iteration computation need be performed, since K-values are now obtained from the best fit. In cases where the cell-block composition has changed considerably within the N time-steps, it is recommended to fit both K and phase split ratio ("q") to obtain the most accurate phase compositions.

The advantage of using this approach in the context of the present invention centers in the fact that GPU performance in these regression computations can be 30 times faster than on a CPU, whereas it was noted before that direct computation of flash via rigorous fugacity equation solution is only about 17 times faster than on a CPU. Note, however, that this faster approach is not a substitute for the full solution scheme, since the full solution is required in order to generate the N preceding time-steps to the point where the regression can be applied.

Significance for Reservoir Simulation

The present invention transfers the time-consuming phase equilibrium computations in a manner that permits more rapid computation by GPU's. Results show gains of more than an order of magnitude when these computations are performed on the GPU rather than the CPU, and move reservoir simulation closer to a level of interactivity required for I-Fields and other real-time data acquisition processes (e.g. Geo-steering of wells being drilled in the reservoir towards their optimum targets).

Although the present invention centers in the acceleration of two-phase thermodynamic equilibrium (gas-liquid equilibrium), extension to three-phase (oil-gas-water phases) would take advantage of the same architecture and perform even more advantageously on the GPU given the increased number of components, which the GPU can tackle with many more computational cores than the CPU.

With the present invention, earlier phase-equilibrium equation-of-state techniques are thus adapted to take advantage of GPU processing. Due to its multi-component nature and the need to perform the computations over each one of hundreds of millions to billions of cells in the reservoir simulator, these computations were found to be very suitable to the multi-threaded nature of many-core GPU's. One implementation of the present invention exploits all 240-cores of a current NVidia Tesla GPU. The techniques can thus naturally extend to exploit all the 512-cores of the forthcoming NVidia Fermi GPU).

Performance Comparison

The table below shows the speedup advantage (performance ratio) of the GPU over the CPU on different hardware configurations.

| CPU | GPU | SPEEDUP |
|---|---|---|
| AMD Opteron 2.33 GHz | NVIDIA Quadro FX5600 | 6.2 |
| Intel Harpertown 3 GHz | NVidia Tesla C1060 | 11.4 |
| AMD Barcelona 2.5 GHz | NVidia Tesla S1070 | 17.0 |

A 17 to 1 speedup, in practical terms, allows the amount of time required to perform flash computations of a 500,000 cell compositional model on a CPU to now be used to tackle an 8,500,000 cell compositional model. Considering that billions of these computations are involved during a typical reservoir simulation, total simulation time can be potentially reduced from hours to just minutes.

Performance Comparison for Regression Curve Computations

The table below is a comparison, for a petroleum fluid with 9 components, of the computation speed for varying reservoir simulation model sizes. The polynominal scaled fit regression curve set forth above was used, since it is representative of the performance ratio obtained between GPU and CPU for the other curves. Due to the many-core architecture of the GPU, transcendental functions and exponentiations are very efficient in the GPU and give them an immediate advantage over CPU whenever these type of computations are involved in a mathematical model.

It should be noted, however, that since an overhead is incurred in transferring the data to the GPU and also transferring the results back from the GPU, the number of cell-blocks in the reservoir model matters. In other words, if very few cells are fed to the many-core architecture, not enough computational load is being exercised relative to the data transfer cost incurred. The table below brings this out very clearly. The hardware used for this data is an Intel Harpertown 3.2 GHz CPU with an NVidia Tesla C1060 GPU.

| Cells (millions) | GPU/CPU performance ratio |
|---|---|
| 4.8 | 33.3 |
| 102.4 | 32.9 |
| 51.2 | 31.5 |
| 25.6 | 25.0 |
| 12.8 | 20.0 |
| 6.4 | 15.1 |
| 3.2 | 7.3 |
| 1.6 | 5.7 |
| 0.8 | 2.4 |
| 0.4 | 1.71 |
| 0.2 | 0.82 |
| 0.1 | 0.46 |

Note that for models of 200,000 cells and smaller, GPU implementation is actually slower than the CPU.

The present invention thus provides a heterogeneous computer hardware design, utilizing GPU's (Graphical Processing Units) to accelerate floating-point computations. The CPU passes to the GPU the information required to perform these accelerated computations and, upon completion, the GPU returns the results to the CPU.

According to the present invention, an acceleration is obtained for the process of tracking the "flash" or fugacity equilibrium by an order of magnitude or more. The present invention thus affords a substantial impact in saving of computer time, reducing costs and also allowing more reservoir studies to be carried out within given time constraints. Acceleration of the computations by GPU's in the present invention enables much faster computations than previously possible, so that the reservoir simulator can keep pace with real-time data acquisition of field measurements, such as in online/interactive reservoir simulation or I-field technology of the type mentioned above.

The present invention utilizes a dual-tier approach to acceleration via GPU's (Graphical Processing Units) to deliver the speed improvement. In the first tier, the conventional nonlinear iterations of thermodynamic equilibrium are solved with the acceleration hardware (GPU) to predict phase compositions (liquid and gas) from pressure and mixture compositions, resulting in a factor of over ten times speedup. In the second tier, a number of regression equations compete to predict new phase split ratio and compositions from already-computed results at previous time-steps. These regression equations are much faster on GPU's than in conventional CPUs because they involve transcendental functions (logarithms and exponentials) and fractional exponentiations that are ideally suited for GPU hardware acceleration.

Prior methods limited themselves to homogenous computer hardware implementations using CPU's. Although the present invention still uses the CPU for input/output and flow control, the computation-intensive data processing steps are handled by the GPU, resulting in a substantial gain in performance and reduction in computer time. The present invention can therefore solve much larger problems per unit of time or, conversely, achieve much faster turnaround for a given problem size. This speed is needed so that real-time reservoir simulations accompanying online data acquisition in I-Field monitoring can become a reality.

Nomenclature of Variables

Set forth below for ease of reference and understanding is a listing of the nomenclature used in the Equations which express the physical relationships between the various parameters and measurements used in data processing steps and analysis according to the present invention:

$A_i$=mixing rule for binary interaction coefficients in equation of state (EOS)
$a_i$=first equation of state (EOS) parameter for component i
$a_m$=mixing rule for "a" parameter in LOS
$b_i$=second equation of state (LOS) parameter for component i
$b_m$=mixing rule for "b" parameter in EOS
$b_1, b_2, b_3$=Canonical equation of state (EOS) parameters
c=shift parameter in EOS
G=Gibbs Free Energy
K=K-value for each component (mole fraction of component in vapor phase/mole fraction of component in liquid phase)
$L_m$=Moles of liquid in the mixture
$n_i$=Moles of hydrocarbon component "i" in the mixture N=number of observations for least-squares statistical regression
$N_c$=number of components in the mixture
P=reservoir pressure
$P_{ci}$=critical pressure for component i
q=phase split ratio (moles in the vapor phase/total moles)
r=statistical correlation coefficient for "goodness-of-fit"
R=universal gas constant
$s_i$=individual shift parameter for component i
S=Sum of the squares of the differences between measured and estimated values
T=reservoir temperature
$T_{ci}$=critical temperature for component i
$T_{ri}$=reduced temperature ($T_{ri}=T/T_{ci}$) for component i
$u_i$=Chemical potential of component "i" in the mixture
V=volume of fluid in equation of state
$V_m$=Moles of vapor in the mixture
$W_A$=equation of state parameter
$W_B$=equation of state parameter
$x_i$=Mole fraction of component i in the liquid phase (in each cell-block)
X=Independent variable for curve-fitting regression
$X_o$=Optional scaling of independent variable for curve-fitting regression
$y_i$=Mole fraction of component i in the gas phase (in each cell-block)
Y=Observed dependent variable for curve-fitting regression
$Y_e$=Estimated dependent variable for curve-fitting regression
$z_i$=Mole fraction of component i in the mixture (in each cell-block)
Z=fluid compressibility factor (=PV/RT)
z=reservoir depth Greek variables:
$\delta_{ij}$=binary interaction coefficient between any two components i and j
$\phi_i$=fugacity coefficient for component i
$\omega_i$=accentric factor for component i
$\rho_j$=Molar density of phase j (j can be "o" for oil, "g" for gas or "w" for water)

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A method of computerized simulation in a computer system of a plurality of data processors, including at least one central processing unit and at least one graphical processing unit, and an output display, the computerized simulation being of mixtures of, and number of phases of individual species of, component hydrocarbon fluids of a subsurface reservoir to simulate performance and production from the reservoir, the subsurface reservoir being simulated by a model partitioned into a number of cells arranged in an organized system of cells, the simulation further being based on geological and fluid characterization information for the cells of the reservoir, the computerized simulation method comprising computer processing steps of:
(a) receiving geological and fluid characterization information for the cells and the reservoir in the central processing unit;
(b) transferring the geological and fluid characterization information from the central processing unit for further processing;
(c) processing the transferred geological and fluid characterization information in the graphical processing unit to determine the mixture of component hydrocarbon fluids in each of the cells of the reservoir;
(d) processing the transferred geological and fluid characterization information in the graphical processing unit to determine the number of phases of individual species of the hydrocarbon fluids of each of the cells of the reservoir;
e) transferring the determined mixtures of component hydrocarbon fluids and the determined number of phases of the individual hydrocarbon species of component fluids of each of the cells of the reservoir from the graphical processing unit to the central processing unit; and
f) forming an output display of the determined mixtures of component hydrocarbon fluids and the determined number of phases of the individual hydrocarbon species of the component fluids of the cells of the reservoir at desired locations in the reservoir to simulate performance and production from the reservoir.

2. The method of claim 1, wherein the step of processing the transferred geological and fluid characterization information in the graphical processing unit to determine the number of phases of the component compositional variables indicates the presence of multiple phases of a component fluid of a cell in the reservoir.

3. The method of claim 2, further including the computer processing step of:
determining mole fractions of components in each of the indicated multiple fluid phases.

4. The method of claim 2, further including the computer processing step of:
determining density of each of the indicated multiple fluid phases.

5. The method of claim 1, wherein the step of processing the transferred geological and fluid characterization information in the graphical processing unit to determine the number of phases of the component compositional variables indicates the presence of a single phase of a component fluid of a cell in the reservoir.

6. The method of claim 5, further including the computer processing step of:
determining state of the indicated single phase.

7. The method of claim 5, further including the computer processing step of:
determining the density of the indicated single phase.

8. A data processing system for computerized simulation of the mixture of, and the number of fluid phases of individual species of component hydrocarbon fluids in a subsurface reservoir to simulate performance and production from the reservoir, the subsurface reservoir being simulated by a model partitioned into a number of cells organized into a system, the simulation further being based on geological and fluid characterization information for the cells of the reservoir being simulated, the data processing system comprising:
(a) a central processor performing the steps of:

(1) receiving geological and fluid characterization information for the cells and the reservoir;

(2) transferring the geological and fluid characterization information from the central processor for further processing;

(b) a graphical processor for performing the steps of:

(1) receiving the transferred geological and fluid characterization information from the central processor;

(2) processing the transferred geological and fluid characterization information to determine the mixture of component hydrocarbon fluids in each of the cells of the reservoirs;

(3) processing the geological and fluid characterization information graphical processing unit to determine the number of phases of individual species of component hydrocarbon fluids of each of the cells of the reservoir; and (4) transferring the determined mixtures of component hydrocarbon fluids and the determined number of phases of the individual hydrocarbon species of the component hydrocarbon fluids of the cells of the reservoir from the graphical processing unit to the central processing unit; and (c) a memory for storing the determined mixtures of components hydrocarbon fluids and the determined number of phases of the individual hydrocarbon species of the component hydrocarbon fluids of the cells of the reservoir.

9. The data processing system of claim 8, wherein the graphical processor in processing the transferred geological and fluid characterization information determines the presence of multiple phases of a component fluid of a cell in the reservoir.

10. The data processing system of claim 9, further including:

the graphical processor determining mole fractions of each of the multiple phases.

11. The data processing system of claim 10, further including:

the graphical processor determining the density of each of the multiple phases.

12. The data processing system of claim 8, wherein the graphical processor in processing the transferred geological and fluid characterization information determines the presence of a single phase of a component fluid in the reservoir.

13. The data processing system of claim 12, further including:

the graphical processor determining the state of the single phase.

14. The data processing system of claim 12, further including:

the graphical processor determining the density of the single phase.

15. A data storage device having stored in a non-transitory computer readable medium computer operable instructions for causing a data processing system comprising at least one central processing unit and at least one graphical processing unit, and an output display to simulate the mixture and the number of fluid phases of individual hydrocarbon species of component hydrocarbon fluids as subsurface reservoir, the subsurface reservoir being simulated by a model partitioned into a number of cells organized into a system, the simulation further being based on geological and fluid characterization information for the cells of the reservoir being simulated, the instructions stored in the data storage device causing the data processing system to perform the following steps:

(a) receiving geological and fluid characterization information for the cells and the reservoir in the central processing unit;

(b) transferring the geological and fluid characterization information from the central processing unit for further processing;

(c) processing the transferred geological and fluid characterization information in the graphical processing unit to determine the mixture of component hydrocarbon fluids in each of the cells of the reservoir;

(d) processing the transferred geological and fluid characterization in formation in the graphical processing unit to determine the number of phases of individual species of the hydrocarbon fluids of each of the cells of the reservoir;

(e) transferring the determined mixtures of component hydrocarbon fluids and the determined number of phases of the individual hydrocarbon species of component fluids of each of the cells of the reservoir from the graphical processing unit to the central processing unit; and (f) forming an output display of the determined mixtures of component hydrocarbon fluids and the determined number of phases of the individual hydrocarbon species of the component fluids of the cells of the reservoir at desired locations in the reservoir to simulate performance and production from the reservoir.

16. The data storage device of claim 15, wherein the presence of multiple phases of component compositional variables is determined for a component fluid of a cell in the reservoir, and the instructions further include instructions causing the data processor system to perform the step of:

determining the density of each of the multiple phases.

17. The data storage device of claim 15, wherein the presence of a single phase of component compositional variables is determined for a component fluid of a cell in the reservoir, and the instructions further include instructions causing the data processor system to perform the step of:

determining the density of the single phase.

18. The data storage device of claim 15, wherein the presence of multiple phases of the component compositional variables is determined for a component fluid of a cell in the reservoir, and the instructions further include instructions causing the data processor system to perform the step of:

determining mole fractions of components in each of the multiple phases of the cell.

19. The data storage device of claim 15, wherein the presence of a single phase of component compositional variables is determined for a component fluid of a cell in the reservoir, and the instructions further include instructions causing the data processor system to perform the step of:

determining the density of the single phase.

20. The data processing system of claim 8, further including:

an output display forming a graphical image of the component compositional variables of the individual hydrocarbon species of the oil and gas phases fluids of the cells of the reservoir at desired locations in the reservoir.

* * * * *